Oct. 1, 1957 V. DURBIN 2,808,483
DYNAMO ELECTRIC MACHINE
Filed April 2, 1952 3 Sheets-Sheet 1
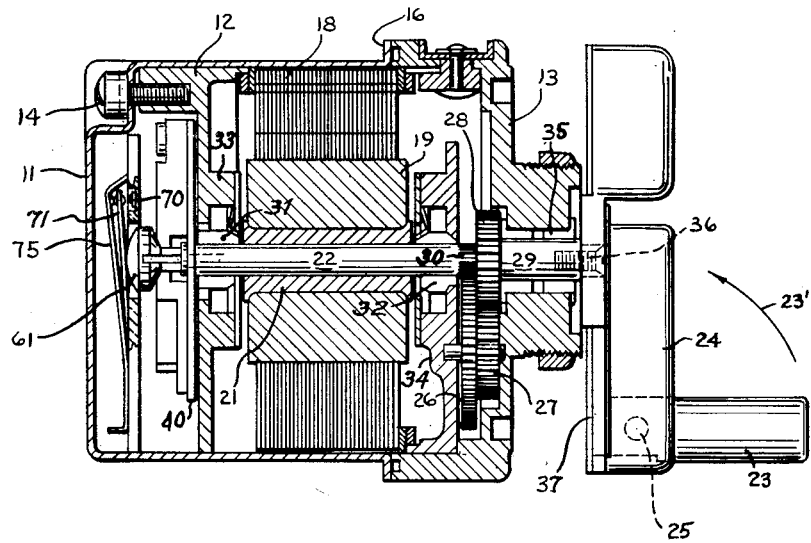
FIG. 1
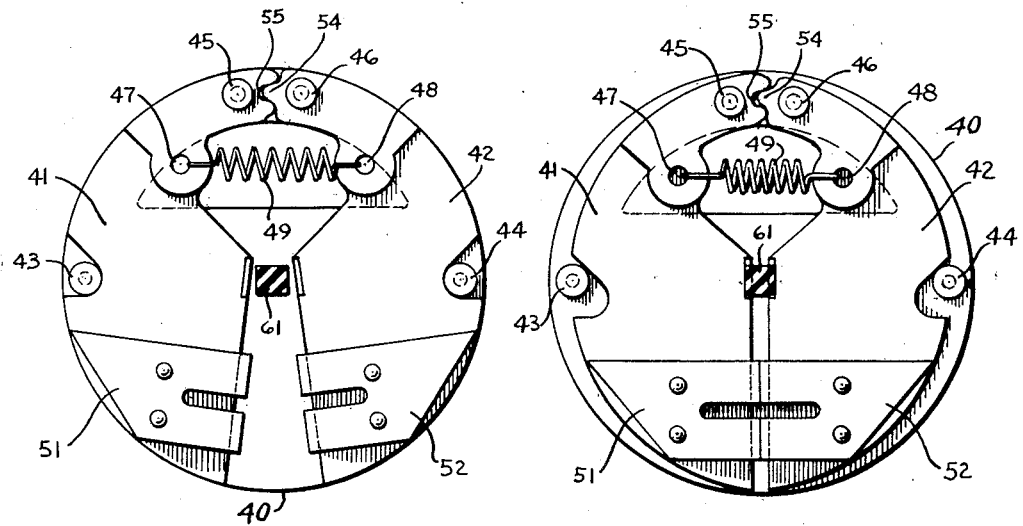
FIG. 2
FIG. 3
FIG. 14
INVENTOR.
VERNON DURBIN
BY Martin J. Finnegan
ATTORNEY Oct. 1, 1957 V. DURBIN 2,808,483
DYNAMO ELECTRIC MACHINE
Filed April 2, 1952 3 Sheets-Sheet 2
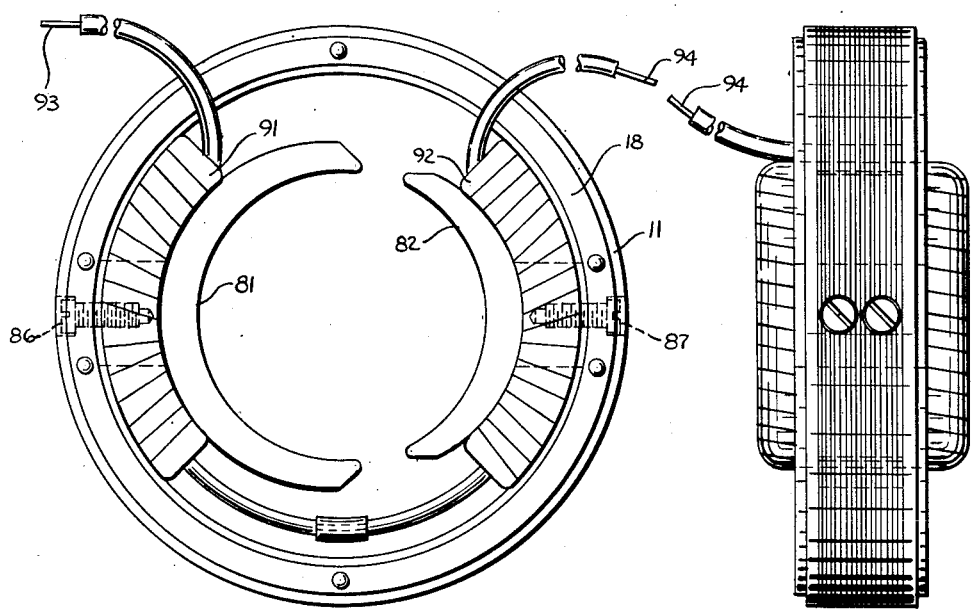
FIG. 4  FIG. 5
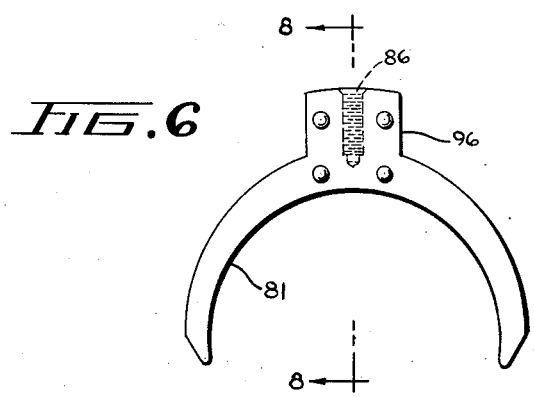
FIG. 6  FIG. 7
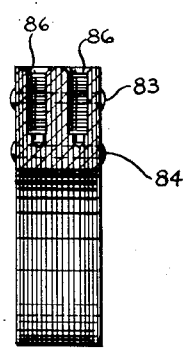
FIG. 8
INVENTOR.
VERNON DURBIN
BY
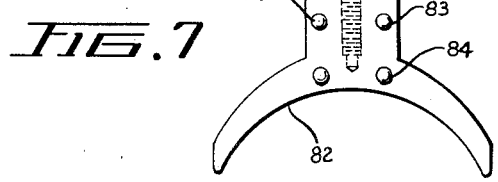
ATTORNEY Oct. 1, 1957 V. DURBIN 2,808,483
DYNAMO ELECTRIC MACHINE
Filed April 2, 1952 3 Sheets-Sheet 3
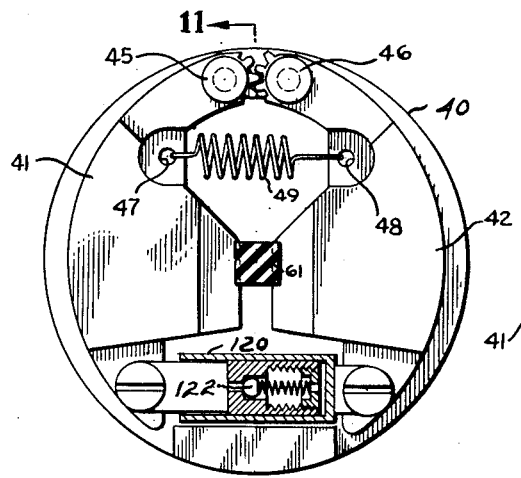
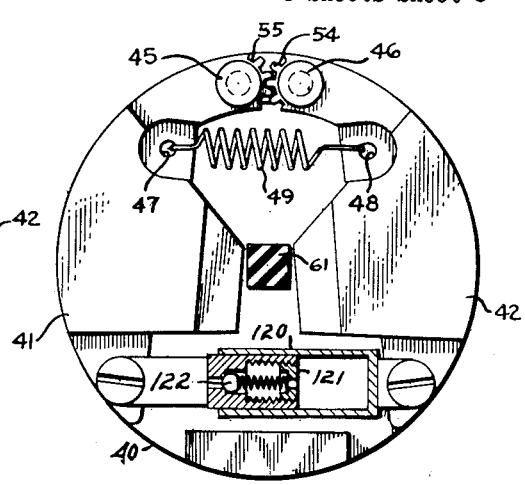
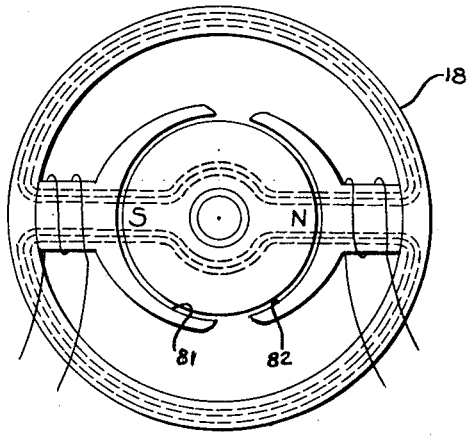
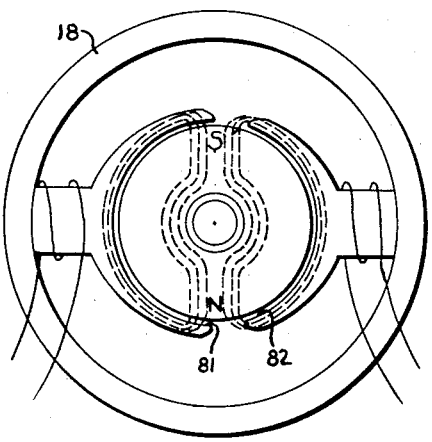
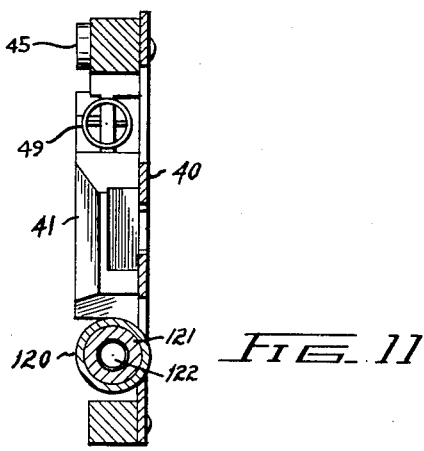
INVENTOR.
VERNON DURBIN
BY
ATTORNEY

United States Patent Office 2,808,483
Patented Oct. 1, 1957

2,808,483

DYNAMO ELECTRIC MACHINE

Vernon Durbin, Waban, Mass., assignor to National Pneumatic Co., Inc., Boston, Mass., a corporation of Delaware Application April 2, 1952, Serial No. 279,991

8 Claims. (Cl. 200—80)

This invention relates to dynamo electric machines and particularly to current generating machines adapted for relatively low speed or manual operation, as by the turning of a hand-operable crank attached to or connecting with the rotor shaft of the machine.

For the generation of electric current to send signaling impulses, as in certain types of telephone systems, it is customary to employ a current generator of relatively small dimensions, involving usually a rotor having an inductor element or elements of permanently magnetic material and a wound stator having two salient poles producing, upon rotation of the inductor type rotor, an alternating magnetic flux and resulting current suitable for the transmission of signaling impulses through telephone circuits connecting with the terminals of the stator windings; the rotor of the machine being operated manually through the instrumentality of a crank at one end of the machine. In order to provide for the automatic transfer of circuit connections, as between the "talking circuit" and the signaling ("ringing") circuit, it is customary to include, as an integral part of the machine, some type of automatic switching mechanism to render the ringing circuit operative only when the machine has been accelerated to a predetermined speed.

One object of the present invention is to provide in a manually operable current generating machine of the character indicated, a novel speed-responsive mechanism for operating electrical contacts in a signal controlling circuit when the generator speed of rotation reaches a predetermined value.

A second object of the invention is to provide, in a speed-responsive circuit controlling mechanism of the character indicated, novel means for preventing "fluttering" of the contact elements of the circuit controlling mechanism whether prior to, during, or following movement of the switch contacts to the circuit-closing position.

A third object of the invention is to provide a novel circuit controlling mechanism incorporating permanently magnetic elements responsive to centrifugal force to control operation of the contact elements in such manner as to suppress vibrating tendencies and thus eliminate flutter.

A further object of the invention is to provide a current generating machine adapted for relatively low speed operation and incorporating novel stator construction the result of which is to minimize or eliminate the impulsing or "cogging" characteristic that has been a handicap in similar machines heretofore employed. In this connection a feature of the invention is the formation of the stator poles in such manner as to produce unequal pole faces in opposite poles of the machine so that the progress of the magnetic field, in terms of flux density, is such as to improve the voltage developing characteristics of the machine at any point in the cycle of rotation; the novel arrangement being such that substantially all of the magnetic flux lines are retained within the limits of the iron portions of the stator in all angular positions throughout the path of rotation, and hence tend toward substantial constancy of torque input, to a decidedly greater degree than in machines heretofore constructed; at the same time the arrangement being such that the overall electrical output of the machine compares favorably with that of machines of similar size heretofore constructed, notwithstanding the modulation of the flux density cycle as just described.

These and other objects of the invention will be better understood on reference to the following description of the embodiment of the invention illustrated in the accompanying drawings wherein:

Fig. 1 is a central sectional view of a machine embodying the invention;

Fig. 2 is a view in elevation of the centrifugal circuit controlling mechanism, the view being taken with the movable parts in their outer positions;

Fig. 3 is a view in elevation of the parts shown in Fig. 2 but with said parts in the relative positions which they assume when the machine is at rest;

Fig. 4 is a transverse sectional view through the stator portion of the machine;

Fig. 5 is a view of the stator from a point at right angles with the view point of Fig. 4;

Figs. 6 and 7 are elevation views of the individual polar elements;

Fig. 8 is a sectional view of the polar elements shown in Fig. 6;

Figs. 9, 10 and 11 show a modified type of centrifugal circuit control means; Figs. 12 and 13 are schematic diagrams of the magnetic flux action; and Fig. 14 is a diagram of the electrical connections.

Referring first to Figs. 1, 2 and 3 the machine is shown as including a sectional housing composed of a cup-shaped metallic stamping 11 and a pair of castings 12 and 13, the casting 12 having tapped holes to receive fastening screws 14 by which the stamping 11 is held in place with the casting 13 having registry with the circular flange 16 in which the stamping 11 terminates and through which the stamping is fastened to said casting 13; the latter also being provided with suitable means (not shown) by which the machine may be attached to an external supporting element. Secured between the supporting elements 12 and 13 are the field laminations 18 attached to housing element 13 by long screws (not shown), and to which laminations 18 the salient pole assemblies, hereafter described, are attached. The rotor of the machine is indicated 19 as being mounted upon a spool or sleeve 21 secured to a central shaft 22 adapted to be rotated by the manually operable crank handle 23 by reason of the interposed gear train. As shown the gear train includes spur gears 26, 27 and 28, the latter being integrated with a sleeve 29 whose axis is aligned with that of the shaft 22, and gear 26 being in mesh with teeth 30 cut directly upon the shaft 22. Bearing assemblies 31, 32, in end supports 33, 34, support the rotor; there being additional bearing means 35 interposed between the sleeve 29 and the surface of the casting 13. The crank handle 23 is pivotally mounted on the main body 24 of the crank as indicated at 25, being pivotal in the direction of the arrow 23' from the extended position shown in Fig. 1 to a retracted position substantially parallel to the body 24, and the body 24 of the crank is in turn secured to the shaft 29 by suitable means as indicated at 36. A leaf spring 37 exerts resilient pressure to retain the handle 23 in either extreme position as desired.

It is desirable that the automatic circuit controlling means be so constructed that when the speed of the generator reaches a point where the contacts are operated, there will be no "fluttering" or "chattering" of the contact device. When the generator is being cranked by hand the speed of rotation is not constant throughout each revolution of the crank and a centrifugally operated switch may therefore tend to chatter. It is desirable, therefore, to make the centrifugal switch with a large differential so that the speed at which the contacts operate when the generator is being accelerated is very much higher than the speed at which the contacts operate when the generator is being decelerated.

The novel circuit controlling mechanism, as shown in Figs. 2 and 3, includes a pair of centrifugal elements 41 and 42 having recessed portions to receive guide pins 43, 44, 45 and 46 and having apertures 47 and 48 to receive the ends of a coiled tension spring 49 serving constantly to urge the two elements 41 and 42 toward each other, that is, into the relative positions indicated in Fig. 3. Also serving to urge the two elements 41 and 42 into the Fig. 3 positions are the blocks 51 and 52 of permanent magnet material, the said blocks being secured to the centrifugal weights 41 and 42 respectively in such positions thereon that their adjacent faces go into abutting relationship to constitute the extreme inward position as illustrated in Fig. 3. When the magnets are in close contact, as shown in Fig. 3, they attract each other with considerable force and they will therefore hold together until the speed of the generator reaches a point where the centrifugal force action on the weights is sufficient to overcome the tension of spring 49 and the attraction of the magnets 51 and 52. When this condition occurs the weights will suddenly fly out and assume the position shown in Fig. 2. Under these conditions the air gap between the two magnets 51 and 52 becomes so great that there is practically no magnetic attraction between them and the speed of rotation must therefore be sharply reduced before the spring 49 will overcome the centrifugal force and restore the centrifugal weights to the position shown in Fig. 3.

When the magnets approach each other they start to attract and they come together with a snap action. In other words, the construction used insures that as the speed of the generator is being increased the contacts operate at a predetermined speed without any fluttering or chattering, and the same non-chattering result is achieved as the speed of rotation is decreased.

I have devised an alternate method of securing satisfactory "non-chattering" operation, and that is to provide a pneumatic dash-pot effect, as a substitute for permanent magnets. As shown in Figs. 9, 10 and 11 the dash-pot includes a cylinder 120 and a piston 121 provided with a check valve 122 permitting the piston 121 to operate quickly when the centrifugal force acting on the weights reaches a point where they tend to go from the "at-rest" position of Fig. 3 to the outer position of Fig. 2. When the speed of the generator is reduced the dash-pot retards the motion of the centrifugal weights so that the weights come together slowly to assume the "at-rest" position at zero speed of the generator.

To insure synchronous motion of the two weights at all times, the weight 42 is provided at its pivoting end with a tooth like projection 54 adapted to register with a corresponding depression 55 in the surface of the tail portion of the weight 41. Interposed between the weights, at the central axis of the machine is a contact actuating plunger 61 of insulating material (nylon); said plunger 61 having sloping sides so disposed in relation to the adjacent surfaces of the weights as to exert an axially directed thrust against the leaf spring contact element 71 (Fig. 1) to close the "talking" circuit through outer contact spring 75 in response to angular motion of the weights from the Fig. 2 position to the position indicated in Fig. 3. Hence when the machine is at rest the leaf spring 71 will be in its outermost position, but will move back into the "ringing" position (Fig. 14) when the pressure thereon is withdrawn, as will occur when the weights swing outwardly to the Fig. 2 position and thus relieve the pressure on the plunger 61.

The novel means for obtaining a more effective voltage alternating pattern, with suppression of the "rough spots," or cogging effects, that have been characteristic of two-pole hand generators heretofore constructed, will now be described. Referring to Figs. 4 to 8, inclusive, it will be noted that while each salient pole face is symmetrically disposed with respect to a median plane passing centrally through the two polar assemblies, one pole face is of considerably greater arcuate extent than the other—so much so that the peripheral air gap between the adjacent pole tips is reduced to an arc of unusually small extent. If the permeability of the magnetic circuit could be kept constant as the permanent magnet rotor is rotated, the torque required would be in effect constant. In order to generate the voltage in the coils it is, of course, necessary that there be a change in the flux through the cores. The shape of the long pole shoe shown in Fig. 6 is such that when the permanent magnet rotor is in a position where its poles are opposite the ends of the extension (see Fig. 13) a flux path is maintained from one pole to the other, but without threading the coils. When the permanent magnet is rotated 90° so that the poles of the magnet are opposite the shanks of the pole pieces (see Fig. 12), the flux path then is through the field ring so that in this position there is a maximum flux threading the coils. Therefore, when the magnet is rotated the flux through the coils varies from minimum to maximum and the voltage introduced into the coils alternates correspondingly; but the magnetic reluctance remains practically constant throughout, due to the pole shoe relationships just referred to.

As illustrated in Figs. 6 and 7, the shanks 96, 97 of the polar assemblies 81, 82 are of the same size, that is, only the arcuate tips differ in size and arcuate extent. The shanks 96, 97 are secured to the encircling stator portion 18 by suitable means 86, 87, after the respective laminated polar assemblies are integrated, as by rivets 83, 84. The two field windings 91, 92 are serially connected, and their ends 93, 94 lead to the signal equipment (not shown); one of the leads, however, being directed thereto by way of terminal 70 of the switching mechanism, of which leaf spring 71 constitutes the controlling element, as heretofore described. Because of this interposed switch mechanism, the signal equipment remains electrically disconnected from the generator until the generator speed rises sufficiently to move weights 41, 42 from the Fig. 3 setting to that of Fig. 2, thereby permitting spring contacts 71, 70 to close, as heretofore explained.

What I claim is:

1. In a dynamo-electric machine comprising a rotor, a stator, a winding on one of said rotor and said stator, switching mechanism connected to said winding, and actuating means operatively connected to said switch to cause the latter to open and close; the improvement which comprises said actuating means comprising a pair of centrifugal elements rotated by said rotor about the axis of rotation of said rotor, each of said centrifugal elements being positioned on opposite sides of said axis and said centrifugal elements being movable between positions close to and remote from said axis depending upon the speed of rotation of said rotor, an operative connection between said centrifugal elements and said switch to cause the latter to open and close depending upon the position of said centrifugal elements relative to said axis and a dashpot comprising a cylinder and a piston movable therein, each mounted on one of said centrifugal elements respectively so as to be pivotable about an axis, said axes being located at points on said centrifugal elements which move relative to one another as said centrifugal elements move between their positions close to and remote from the axis of said support.

2. The machine of claim 1, in which said dashpot resists movement of said elements in one direction more than in the other direction.

3. In a dynamo-electric machine comprising a rotor, a stator, a winding on one of said rotor and said stator, switching mechanism connected to said winding, and actuating means operatively connected to said switch to cause the latter to open and close; the improvement which comprises said actuating means comprising a pair of centrifugal elements rotated by said rotor about the axis of rotation of said rotor, each of said centrifugal elements being positioned on opposite sides of said axis and said centrifugal elements being movable between positions close to and remote from said axis depending upon the speed of rotation of said rotor, an operative connection between said centrifugal elements and said switch to cause the latter to open and close depending upon the position of said centrifugal elements relative to said axis, and a magnet and a member magnetically attracted thereto, one on each of said centrifugal elements at points which move relative to one another as said centrifugal elements move toward and away from said axis, the spacing between said magnet and said member thereby being varied as said centrifugal elements move between their positions close to and remote from the axis of said support, said magnet and member each being oriented from its respective centrifugal element toward the other centrifugal element and operatively engaging when said centrifugal elements are positioned close to the axis of said support.

4. A centrifugal switch comprising a support adapted to be rotated about an axis, a pair of centrifugal elements mounted on said support and each positioned on opposite sides of said axis, said centrifugal elements being movable between extreme positions close to and remote from said axis depending upon the speed of rotation of said support, switch contacts, an operative connection between said centrifugal elements and said switch contacts to cause the latter to open and close depending upon the position of said centrifugal elements relative to said axis, resilient means urging said elements toward their positions close to said axis, and members mounted on said centrifugal elements respectively, operatively engaging one another in at least one relative position of said centrifugal elements, and when thus operatively engaged mutually cooperating to permit but retard movement of said elements toward another relative position thereof, said members being effective to retard movement of said elements between their extreme positions in one direction to a greater extent than they retard such movement in the opposite direction.

5. A centrifugal switch comprising a support adapted to be rotated about an axis, a pair of centrifugal elements mounted on said support and each positioned on opposite sides of said axis, said centrifugal elements being movable between extreme positions close to and remote from said axis depending upon the speed of rotation of said support, switch contacts, an operative connection between said centrifugal elements and said switch-contacts to cause the latter to open and close depending upon the position of said centrifugal elements relative to said axis, resilient means urging said elements toward their positions close to said axis, and members mounted on said centrifugal elements respectively, operatively engaging one another in at least one relative position of said centrifugal elements, and when thus operatively engaged mutually cooperating to permit but retard movement of said elements toward another relative position thereof.

6. A centrifugal switch comprising a support adapted to be rotated about an axis, a pair of centrifugal elements mounted on said support and each positioned on opposite sides of said axis, said centrifugal elements being movable between positions close to and remote from said axis depending upon the speed of rotation of said support, switch contacts, an operative connection between said centrifugal elements and said switch contacts to cause the latter to open and close depending upon the position of said centrifugal elements relative to said axis, and a dashpot comprising a cylinder and a piston movable therein, each mounted on one of said centrifugal elements respectively so as to be pivotable about an axis, said axes being located at points on said elements which move relative to one another as said centrifugal elements move between their positions close to and remote from the axis of said support.

7. The switch of claim 6, in which said dashpot resists movement of said elements in one direction more than in the other direction.

8. A centrifugal switch comprising a support adapted to be rotated about an axis, a pair of centrifugal elements mounted on said support and each positioned on opposite sides of said axis, said centrifugal elements being movable between positions close to and remote from said axis depending upon the speed of rotation of said support, switch contacts, an operative connection between said centrifugal elements and said switch contacts to cause the latter to open and close depending upon the position of said centrifugal elements relative to said axis, and a magnet and a member magnetically attracted thereto, one on each of said centrifugal elements at points which move relative to one another as said centrifugal elements move toward and away from said axis, the spacing between said magnet and said member thereby being varied as said centrifugal elements move between their positions close to and remote from the axis of said support, said magnet and member each being oriented from its respective centrifugal element toward the other centrifugal element and operatively engaging when said centrifugal elements are positioned close to the axis of said support.

References Cited in the file of this patent

UNITED STATES PATENTS

| | | |
|---|---|---|
| 1,017,212 | Honold et al. | Feb. 13, 1912 |
| 1,017,597 | Seeley | Feb. 13, 1912 |
| 1,081,832 | Hume | Dec. 16, 1913 |
| 1,638,239 | Bryson | Aug. 9, 1927 |
| 2,120,109 | Merrill | June 7, 1938 |
| 2,387,533 | Schmucker | Oct. 23, 1945 |
| 2,432,699 | Taylor | Dec. 16, 1947 |
| 2,446,923 | Hardy | Aug. 10, 1948 |
| 2,557,953 | Duron | June 26, 1951 |
| 2,624,814 | Shewmon | Jan. 6, 1953 |
| 2,643,310 | Randol | June 23, 1953 |
| 2,677,539 | Winslow | May 4, 1954 |
| 2,708,696 | Leitner et al. | May 17, 1955 |

FOREIGN PATENTS

| | | |
|---|---|---|
| 490 of 1892 | Great Britain | Feb. 13, 1892 |
| 734,310 | France | July 26, 1932 |